United States Patent
Rocher et al.

(10) Patent No.: US 11,466,632 B2
(45) Date of Patent: Oct. 11, 2022

(54) METHOD FOR SYNCHRONIZING AN INTERNAL COMBUSTION ENGINE

(71) Applicant: VITESCO TECHNOLOGIES GMBH, Hanover (DE)

(72) Inventors: Jacques Rocher, Toulouse (FR); Yannick Leroy, Toulouse (FR); Benjamin Marconato, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 0 days.

(21) Appl. No.: 17/293,329

(22) PCT Filed: Nov. 13, 2019

(86) PCT No.: PCT/EP2019/081146
§ 371 (c)(1),
(2) Date: May 12, 2021

(87) PCT Pub. No.: WO2020/099471
PCT Pub. Date: May 22, 2020

(65) Prior Publication Data
US 2021/0404396 A1 Dec. 30, 2021

(30) Foreign Application Priority Data
Nov. 14, 2018 (FR) ...................... 1860492

(51) Int. Cl.
*F02D 41/00* (2006.01)
*F02D 41/26* (2006.01)
*F02B 75/02* (2006.01)

(52) U.S. Cl.
CPC ............ *F02D 41/009* (2013.01); *F02B 75/02* (2013.01); *F02D 41/26* (2013.01); *F02B 2075/027* (2013.01)

(58) Field of Classification Search
CPC .. F02D 41/009; F02D 41/26; F02D 2041/281; F02D 2041/286
See application file for complete search history.

(56) References Cited

U.S. PATENT DOCUMENTS 4,381,748 A * 5/1983 Eckert .................. F02D 35/022
123/406.28
6,615,644 B2 * 9/2003 Koo ...................... G01M 15/06
73/114.25

(Continued)

FOREIGN PATENT DOCUMENTS

FR 2 441 829 6/1980
FR 2 981 121 4/2013

(Continued)

OTHER PUBLICATIONS

International Search Report and Written Opinion of the ISA for PCT/EP2019/081146 dated Mar. 5, 2020, 14 pages.

*Primary Examiner* — Phutthiwat Wongwian
*Assistant Examiner* — Anthony L Bacon
(74) *Attorney, Agent, or Firm* — Nixon & Vanderhye

(57) ABSTRACT

The aim of the present invention is a method for synchronizing an engine comprising at least one movable piston of a four-stroke internal combustion engine, said method comprising a first step (e1) involving initializing a second memory space, a second step (e2) involving waiting for an edge on a fourth signal (CAM_TOT), a fourth step (e4) involving testing the value of a counter (CPT), an eighth step (e8) involving selecting the theoretical angular positions of the slots of the second signal (CAM_IN) relative to the edges of a first signal (CRK) and of the slots of a third signal (CAM_EX) relative to the edges of the first signal (CRK).

8 Claims, 3 Drawing Sheets

(56) References Cited

U.S. PATENT DOCUMENTS 7,167,793 B1 * 1/2007 Gibson ................ F02D 41/009
                                                    701/115
2010/0263438 A1 10/2010 Bagnasco et al.

FOREIGN PATENT DOCUMENTS

| FR | 3 059 717 | 6/2018 |
| FR | 3 068 463 | 1/2019 |
| WO | 2019/002791 | 1/2019 |

* cited by examiner

Prior Art

METHOD FOR SYNCHRONIZING AN INTERNAL COMBUSTION ENGINE

This application is the U.S. national phase of International Application No. PCT/EP2019/081146 filed Nov. 13, 2019 which designated the U.S. and claims priority to FR Patent Application No. 1860492 filed Nov. 14, 2018, the entire contents of each of which are hereby incorporated by reference.

The present invention generally relates to the techniques of synchronizing an internal combustion engine.

More specifically, it relates to a method for determining the state of rotation of at least one camshaft of a heat engine.

The control of the performance of an internal combustion engine, as well as the control of the emission of pollutants, are important parameters for motor vehicle manufacturers. To this end, among other things, the position of the pistons in their respective cylinder during an engine cycle needs to be known with relatively high precision.

Document FR 2441829 discloses means for detecting information relating to the position of the cylinders by identifying, on a target secured to a crankshaft, zones associated with angular positions corresponding to a determined phase of the stroke of different pistons. The associated target is made up of a disk having identification elements disposed along its periphery. A sensor, generally in a fixed position, then detects these identification elements and generates a signal made up of electric pulses allowing the passage, for example, to a top dead center (TDC) of a reference piston to be identified during an intake phase.

However, these sole identification elements are insufficient for precisely knowing the position of the cylinders during the engine cycle. Indeed, for a four-stroke internal combustion engine, the crankshaft completes two revolutions, that is an angle of 720°, before a given piston returns its initial position corresponding to the end of an engine cycle. This means that, based on the sole observation of the rotation of the target secured to the crankshaft, it is not possible to provide information concerning each cylinder without uncertainty with respect to two engine strokes in the cycle, with the identification of the position of the top dead center covering both an intake phase and an exhaust phase.

Since precise determination of the position of each cylinder during an engine cycle cannot be deduced from the sole observation of the target secured to the crankshaft, finding additional information is therefore necessary in order to know whether the cylinder is in the first or in the second half of the engine cycle, i.e. the intake, then compression phase during the first revolution of the target secured to the crankshaft, or the expansion, then exhaust phase during the second revolution of said target.

In order to obtain such additional information, it is known for a person skilled in the art to use a disk (or target) securely mounted on a camshaft or even on any other shaft that is driven by means of a ½ gear reducer from the crankshaft. Combining signals originating from the crankshaft sensor and from the camshaft sensor allows the system to precisely detect, for example, a top dead center in the intake phase of a reference cylinder.

For the sake of optimal control of the combustion, it is increasingly common for an internal combustion engine to comprise at least two camshafts, with, for example, a first camshaft associated with the exhaust and a second camshaft associated with the intake.

Furthermore, still for the sake of improving the performance of the internal combustion engine, it is also increasingly common for variable distribution technology to be used, which enables improvement of the synchronization of the opening or closing of the intake or exhaust valves during an engine cycle. Thus, increasing numbers of sensors are used in order to be able to determine the position of the pistons during an engine cycle.

FIG. 1 illustrates a voltage source sensor 2, typically of the prior art, coupled, for example, to an engine control computer 4. The sensor 2 is, for example, a sensor dedicated to detecting the position of a camshaft of an internal combustion engine. Such a sensor 2 generally comprises three pins, with a first sensor pin 2_1 coupled, for example, to a first computer pin 4_1, which is intended, for example, to transmit a signal for activating the sensor 2, a second sensor pin 22 coupled to a second computer pin 4_2, which is intended for receiving a signal representing the position of the camshaft, and, finally, a third sensor pin 23 coupled to a third computer pin 4_3, which is generally coupled to an electrical ground of the vehicle. Despite good performance, the use of 3 pins for the voltage source sensor 2 with a view to optimizing the connection between the computer and the sensor can be troublesome.

FIG. 2 shows a current source sensor 6 as disclosed, for example, in patent application FR 1756119. This sensor 6 operates and is coupled to the engine control computer 4 using only two pins. For example, a first sensor pin 6_1 is coupled to the first computer pin 4_1, a second sensor pin 6_2 is coupled to the second computer pin 4_2. Thus, for performance levels identical to those of a voltage source sensor 2, one pin is freed up on the engine control computer 4, thus enabling savings with respect to the amount of wiring but also with respect to connectors.

The current source sensor 6 delivers information with respect to the shape of a rectangular "current" type signal. Thus, for a current sensor, two current levels are possible and they represent the presence or the absence of a tooth of the target in front of the sensor 6.

Cleverly, in order to further reduce the amount of wiring, patent application FR 1756119 proposes parallel coupling of at least two current source sensors 6; such coupling is possible using a current measurement device called a "shunt". Thus, for example, it is possible to couple at least two current source sensors 6 on only two wires.

However, with such an assembly, the current levels representing the presence or the absence of teeth in front of the current source sensors 6 are close and it is difficult to determine the passage of a tooth in front of said sensor 6. Furthermore, it is also difficult to determine the source of the change of detected current level.

The present invention intends to overcome the disadvantages of the prior art by proposing a method for determining the state of rotation of at least two camshafts of a heat engine using at least two parallel coupled current source sensors.

To this end, the present invention relates to, in its most general meaning, a method for detecting the position of at least one movable piston in a cylinder of a four-stroke internal combustion engine, with the movement of the piston driving a crankshaft cooperating with at least one first camshaft and one second camshaft, the crankshaft also cooperating with a first target having a determined number of teeth on a first target periphery, the first camshaft cooperating with a second target and the second camshaft cooperating with a third target, the second target having a determined number of teeth on a second target periphery and the third target having a determined number of teeth on the third target periphery, a first sensor adapted, on the one hand, for detecting the passage of the teeth of the first target and, on the other hand, for generating a first signal (CRK), a second sensor adapted, on the one hand, for detecting the passage of the teeth of the second target and, on the other hand, for generating a second signal (CAM_IN), a third sensor adapted, on the one hand, for detecting the passage of the teeth of the third target and, on the other hand, for generating a third signal (CAM_EX), the second sensor and the third sensor being sensors of the current source type coupled in parallel, the parallel coupling enabling the generation of a fourth signal (CAM_TOT), the second sensor and the third sensor also being coupled to a computer responsible for engine management, the first signal (CRK) being made up of a determined number of edges corresponding to the number of teeth of the first target, the second signal (CAM_IN) being made up of slots corresponding to the passages of the teeth of the second target, the third signal (CAM_EX) being made up of slots corresponding to the passages of the teeth of the third target, the fourth signal (CAM_TOT) being made up of slots corresponding to a sum of the second signal (CAM_IN) and of the third signal (CAM_EX), a slot being made up of a rising edge and a falling edge, a first memory space adapted for storing theoretical angular positions of the slots of the second signal (CAM_IN) relative to the edges of the first signal (CRK) and of the slots of the third signal (CAM_EX) relative to the edges of the first signal (CRK), as well as the directions of the edges of said slots, said method being characterized in that it comprises:

- a first step (e1) involving initializing a second memory space adapted for storing information associated with the positions of the slots of the fourth signal (CAM_TOT) relative to the edges of the first signal (CRK), the first step (e1) further comprising a step of initializing a counter (CPT) adapted for counting a number of revolutions completed by the first target;
- a second step (e2) involving waiting for an edge on the fourth signal (CAM_TOT), representing the passage of a tooth of the second target in front of the second sensor or the passage of a tooth of the third target in front of the third sensor, the second step (e2) further comprising proceeding to a third step (e3) when an edge is detected on the fourth signal (CAM_TOT);
- the third step (e3) involving recording, in the second memory space, on the one hand, the nature of the detected edge, i.e. either a rising edge or a falling edge, and, on the other hand, the angular position of said detected edge relative to the first target;
- a fourth step (e4) involving testing the value of the counter (CPT), in the case whereby the value of the counter (CPT) is equal to a value N then the method proceeds to a fifth step (e5), otherwise it proceeds to the second step (e2);
- the fifth step (e5) involving waiting for a new edge on the fourth signal (CAM_TOT), and proceeding to a sixth step (e6) when an edge is detected on the fourth signal (CAM_TOT);
- the sixth step (e6) involving computing an average of the angular position of the last detected edge with the value of the corresponding edge of the preceding revolution of the first target stored in the second memory space;
- a seventh step (e7) involving computing a range of angular positions α determined around the average value of the angular position of said detected edge;
- an eighth step (e8) involving selecting theoretical angular positions of the slots of the second signal (CAM_IN) relative to the edges of the first signal (CRK) and of the slots of the third signal (CAM_EX) relative to the edges of the first signal (CRK) when they are within the range of angular positions computed in the seventh step (e7); in the case whereby no theoretical angular position of the slots of the second signal (CAM_IN) and of the third signal (CAM_EX) is within the range of the computed angular positions, then the method proceeds to a ninth step (e9), in the case whereby a theoretical angular position of a slot of only one of the two signals (CAM_IN) or (CAM_EX) is within the range of computed angular positions, then the method proceeds to a tenth step (e10), in the case whereby a single theoretical angular position of a single slot of the second signal (CAM_IN) and a single theoretical angular position of a single slot of the third signal (CAM_EX) are within the range of the computed angular positions, then the method proceeds to an eleventh step (e11);
- the ninth step (e9) involving generating a warning synonymous with a failure on at least one of the three signals;
- the tenth step (e10) involving not assigning the detected edge to the signal (CAM_IN or CAM_EX), with the non-assigning being for the signal (CAM_IN or CAM_EX) that does not have a slot, the theoretical angular position of which is within the range of computed angular positions of said edge;
- the eleventh step (e11) involving proceeding to the third step (e3) in the case whereby the value of the counter (CPT) is less than the value N, otherwise the method proceeds to a twelfth step (e12).

In one embodiment, during the eighth step (e8), in addition, in the case whereby a theoretical angular position of a slot of only one of the two signals (CAM_IN) or (CAM_EX) is within the range of determined angular positions, the direction of said detected edge is compared with the direction of the corresponding signal (CAM_IN) or (CAM_EX).

For the sake of optimizing the method of the invention, during the eighth step (e8), in addition, in the case whereby a theoretical angular position of a slot of the second signal (CAM_IN) and a single theoretical angular position of a single slot of the third signal (CAM_EX) are within the range of determined angular positions, the direction of said detected edge is compared with the direction of the corresponding signal (CAM_IN) or (CAM_EX).

As an alternative embodiment, the value N of the counter (CPT) equals 2.

In order to improve detection, in the sixth step (e6), the average of the angular position of the detected edge is computed on N revolutions of the first target.

In the case whereby at least one theoretical angular position of a single slot of the second signal (CAM_IN) and a single theoretical angular position of a single slot of the third signal (CAM_EX) are within the range of computed angular positions and when the counter (CPT) has reached a value N', a twelfth step (e12) is carried out involving applying a phase-shift of value (V) to one of the two targets.

During a thirteenth step (e13), the edges of the fourth signal (CAM_TOT) are also detected and stored.

As an alternative embodiment, during a fourteenth step (e14), a comparison is made between the average values of the unassigned edges of the second memory space before the activation of the phase-shifting on one of the two targets and the recorded values of said edges of the fourth signal (CAM_TOT) after the activation of the phase-shifting.

In another alternative embodiment, the non-phase-shifted signal is allocated to the signal with the edge not affected by the phase-shifting of the second target.

The invention will be better understood with the aid of the description, which is provided hereafter solely by way of an explanation, of one embodiment of the invention, with reference to the figures, in which.

Figure 1:
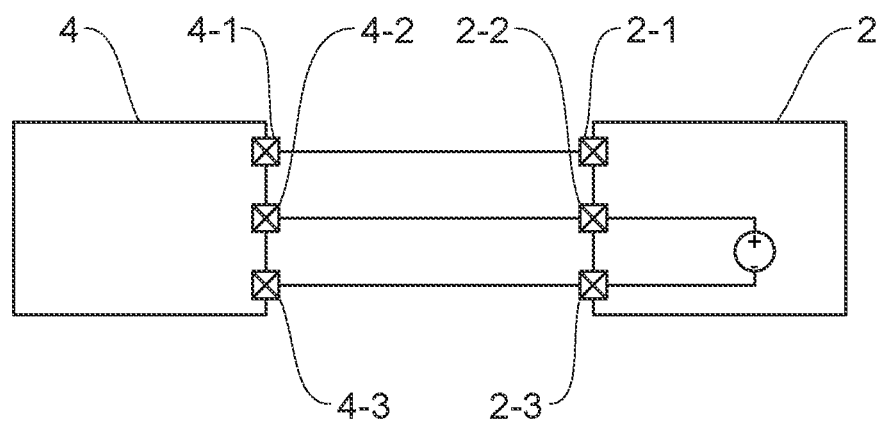
FIG. 1 shows an example of a typical voltage source sensor of the prior art.
Figure 2:
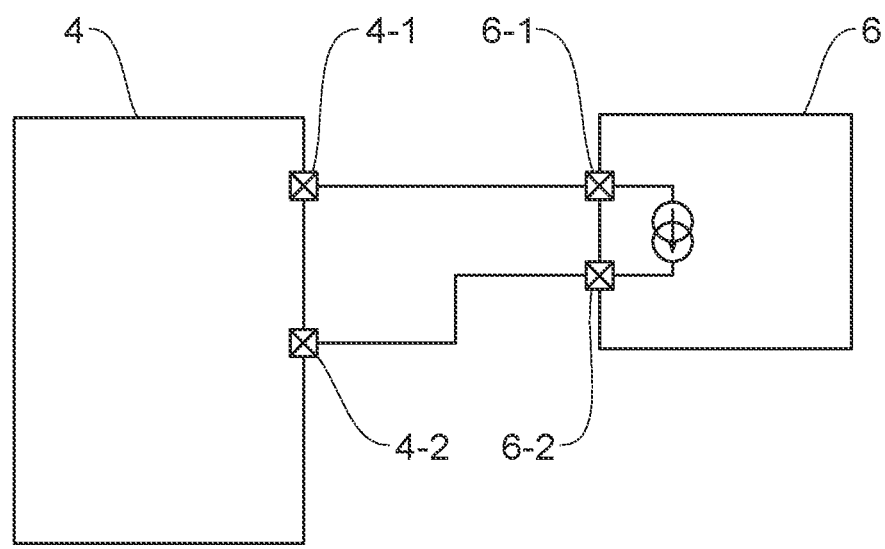
FIG. 2 shows an example of a typical current source sensor of the prior art.

An internal combustion engine comprises a determined number of pistons that can move in combustion chambers. The energy generated in the combustion chambers by the combustion of a fuel in said chambers is transferred by the pistons to the same engine shaft, also called crankshaft, or sometimes hereafter called "crank" or the abbreviation CRK. The intake of fuel and the exhaust of the combustion gases most often occur using valves controlled by at least one camshaft cooperating with the crankshaft.

In order to know the position of the pistons in the cylinders during the operation of the internal combustion engine, i.e. during an engine cycle, a first target secured to the crankshaft is generally used to determine an angular position corresponding to a determined phase of the stroke of the various pistons. The first target is produced using a disk having identification elements disposed along its periphery, such as, for example, teeth. In order to know a reference point, for example, a top dead center of a piston, which is also a reference, a mechanical anomaly is generally used, i.e. one (or more) missing teeth on the periphery of the first target. Of course, the first target can comprise a variable number of teeth as a function of the desired precision.

As previously stated, in order to detect the movement of the first target during an engine cycle, a first sensor is used to detect the passage of the teeth in front of a sensing part of said first sensor. The first sensor uses, for example, Hall-effect technology and generates a voltage peak during the passage of a tooth of the first target.

In an alternative embodiment, the first sensor can be a current source sensor allowing the amount of electric wiring to be substantially reduced between said first sensor and the computer responsible for engine management.

The method of the invention will be presented in the case of an internal combustion engine with two camshafts. A first camshaft mounted on an intake controls the opening and the closing of the intake valves. The number of controlled intake valves can vary as a function of the type of internal combustion engine. A second camshaft for its part is mounted on the exhaust. This second camshaft is adapted to control exhaust valves. Of course, the number of controlled exhaust valves can vary.

The first camshaft is coupled to a second target that is secured to the first camshaft. Similarly, the second camshaft comprises a third target secured to the second camshaft.

The second target is, for example, a disk having a determined number of teeth on its periphery. The third target secured to the second camshaft is also a disk having a determined number of teeth on its periphery. In general, as known by a person skilled in the art, the second target and the third target are driven by means of a ½ gear reducer from the crankshaft. Thus, the second target and the third target complete one revolution for two revolutions of the first target. Throughout the remainder of the embodiment of the invention, the second target and the third target are identical and each have two teeth. The two teeth of the same target have different profiles, for example, two different lengths.

In order to deduce the position of the pistons in the cylinders during an engine cycle, a second sensor and a third sensor are advantageously used. For example, the second sensor is fixedly mounted opposite the second target and the third sensor is fixedly mounted opposite the third target.

In a preferred embodiment of the invention, the second sensor and the third sensor are current generator sensors. Furthermore, they are preferably coupled together in parallel. Thus, by virtue of this coupling and the current source technology of the two sensors, the saving with respect to the amount of wiring between the second sensor, the third sensor and the computer responsible for engine management is improved.

Figure 3:
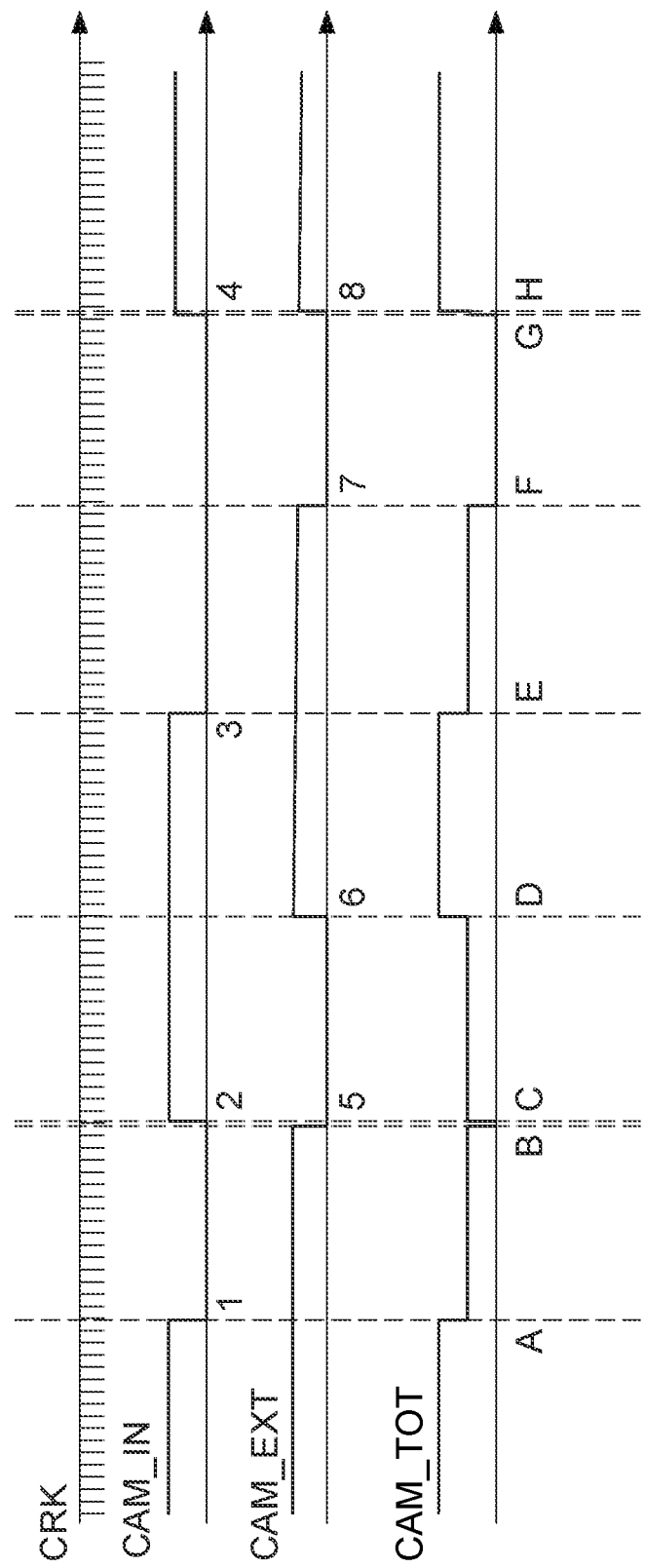
FIG. 3 is a graph representing different signals originating from the parallel coupling of a plurality of sensors of FIG. 2.

FIG. 3 shows a first signal, denoted CRK, originating from the first sensor positioned on the first target, a second signal, denoted CAM_IN, originating from the second sensor and a third signal, denoted CAM_EX, originating from the third sensor. A fourth signal, denoted CAM_TOT, is also shown that represents a signal passing through the wiring parallel to the second sensor and the third sensor.

The first signal CRK is made up of voltage peaks with a determined amplitude. The first signal CRK represents passages of the teeth of the first target in front of the first sensor. In the example of FIG. 3, the first target has 58 teeth, represented by 58 voltage peaks on the graph of the first signal CRK. Furthermore, the first signal CRK has a zone without a voltage peak representing the missing two teeth on the first target. This space without a voltage peak on the first signal CRK allows a complete revolution of said first target to be identified. As previously stated, two crankshaft revolutions, therefore two rotations of the first target, that is 720 degrees, are required in order for a complete engine cycle to be completed.

The second signal CAM_IN, representing the signal output from the second sensor, has two current levels. These levels represent the passage of teeth in front of a sensing part of the second sensor. The current levels are determined and can have a value, for example, for a low level of the order of 2 mA (1 mA=0.001 A) and for a high level of the order of 8 mA. Of course, the current levels can vary as a function of the type of sensor.

In the embodiment shown herein, the second target and the third target have been considered to have the same profile. In the embodiment shown in FIG. 3, the second target has two teeth and the third target also has two teeth.

In this embodiment, the second signal CAM_IN is synchronized relative to the first target and therefore relative to the first signal CRK. The second signal CAM_IN is made up of a first edge, numbered 1, positioned between tooth No. 17 and tooth No. 18 of the first target and represents a transition of the second signal CAM_IN from the high state to the low state. This first edge 1 is positioned at 105° CRK.

A second edge, numbered 2, is positioned between tooth No. 33 and tooth No. 34 of the first target. This second edge 2 represents a transition of the second signal CAM_IN from a low level to a high level. This second edge 2 is positioned at 203° CRK.

A third edge, numbered 3, is present between tooth No. 67 and tooth No. 68 of the first target. Of course, a person skilled in the art will understand that tooth No. 67 of the first target actually corresponds to tooth No. 7 of the first target, plus one revolution of the first target. This third edge 3 represents a transition of the second signal CAM_IN from a high level to a low level. This third edge 3 is positioned at 404° CRK.

A fourth edge, numbered 4, is present between tooth No. 100 and tooth No. 101 of the first target. The same reasoning as before can be used to deduce the actual tooth number. This fourth edge 4 represents a transition of the second signal CAM_IN from a low level to a high level. This fourth edge 4 is positioned at 601° CRK.

The third signal, denoted CAM_EX, is also referenced relative to the first target and therefore relative to the first signal CRK. Thus, the third signal CAM_EX is made up of a fifth edge, numbered 5, positioned between tooth No. 33 and tooth No. 34 of the first target and represents a transition of the third signal CAM_EX from the high state to the low state. This fifth edge 5 is positioned at 202° CRK.

A sixth edge, numbered 6, is positioned between tooth No. 50 and tooth No. 51 of the first target. This sixth edge 6 represents a transition of the third signal CAM_EX from a low level to a high level. This sixth edge 6 is positioned at 303° CRK.

A seventh edge, numbered 7, is present between tooth No. 84 and tooth No. 85 of the first target. This seventh edge 7 represents a transition of the third signal CAM_EX from a high level to a low level. This seventh edge 7 is positioned at 506° CRK.

An eighth edge, numbered 8, is present between tooth No. 100 and tooth No. 101 of the first target. This eighth edge 8 represents a transition of the third signal CAM_EX from a low level to a high level. This eighth edge 8 is positioned at 603° CRK.

These edges are referenced relative to the two teeth of the first target and, in this embodiment, no action is applied to the variable camshafts. Furthermore, the positions in degrees CRK of the edges of the second signal CAM_IN and of the third signal CAM_EX are determined using a technique mastered by a person skilled in the art that allows positioning to be obtained to the nearest degree or ½ degree of the targets.

In this embodiment, advantageously, the third target is mounted on the second camshaft with an angular offset of 16 teeth, that is 96° CRK relative to the second target.

The two signals CAM_IN and CAM_EX shown in FIG. 3 are the signals present on the outputs of the second sensor and of the third sensor, but they are not available individually due to the parallel coupling between said sensors. The signal available and delivered to the computer responsible for engine management is the fourth signal CAM_TOT. Advantageously, the fourth signal CAM_TOT therefore corresponds to the sum of the two signals CAM_IN and CAM_EX.

Thus, the fourth signal CAM_TOT comprises three current levels, contrary to the signals CAM_IN and CAM_EX (two current levels).

The fourth signal CAM_TOT has a first level corresponding to a current level of 4 mA, a second level corresponding to a current level of 10 mA and, finally, a third level corresponding to a current level of 16 mA. Of course, the values of the three levels are provided by way of an example.

The fourth signal CAM_TOT has, for example, a first edge, denoted A, representing a transition from a third level to a second level and corresponding to the first edge No. 1 of the first signal CAM_IN.

The fourth signal CAM_TOT has a second edge, denoted B, representing a transition from the second level to the first level and corresponding to the fifth edge No. 5 of the third signal CAM_EX.

The fourth signal CAM_TOT has a third edge, denoted C, representing a transition from the first level to the second level and corresponding to the second edge No. 2 of the second signal CAM_IN.

The fourth signal CAM_TOT has a fourth edge, denoted D, representing a transition from the second level to the third level and corresponding to the sixth edge No. 6 of the third signal CAM_EX.

The fourth signal CAM_TOT has a fifth edge, denoted E, representing a transition from the third level to the second level and corresponding to the third edge No. 3 of the second signal CAM_IN.

The fourth signal CAM_TOT has a sixth edge, denoted F, representing a transition from the second level to the first level and corresponding to the seventh edge No. 7 of the third signal CAM_EX.

The fourth signal CAM_TOT has a seventh edge, denoted G, representing a transition from the first level to the second level and corresponding to the fourth edge No. 4 of the second signal CAM_IN.

Finally, the fourth signal CAM_TOT has an eighth edge, denoted H, representing a transition from the second level to the third level and corresponding to the eighth edge No. 8 of the third signal CAM_EX.

Throughout the remainder of the description, the method of the invention will be described that allows the position of at least one reference piston to be determined from the fourth signal CAM_TOT during an engine cycle.

The steps of the flowchart of the invention can be launched after a start-up phase of the internal combustion engine, i.e., for example, after an engine synchronization phase has been completed and also after a phase for calibrating the sensors has been completed. A calibration phase of a sensor is understood to mean that the sensor has reached a stable position for the edges. During this phase of calibrating the sensor, said sensor sets its magnetic commutation threshold to a value that ensures this stability despite different assembly conditions.

Throughout the remainder of the description, it is firstly considered that the variable camshafts are deactivated and that all the calibration and/or setting processes of the various elements of the engine have been completed. Furthermore, in a preferred embodiment, the method of the invention is executed based on the detection of a movement of the first target, and therefore of the passage of the first tooth (or reference tooth) thereof.

Additionally, in a preferred embodiment of the invention, a first memory space is allocated, for example, in the computer responsible for engine management, for storing information relating to the theoretical positions of the edges of the second signal CAM_IN and of the third signal CAM_EX relative to the first signal CRK.

Thus, for example, during a first phase of calibrating the position of the targets, the first memory space (or the first table in the remainder of the description) is filled with the theoretical positions of the edges corresponding to the passages of the teeth of the second target in front of the second sensor and to the passages of the teeth of the third target in front of the third sensor.

With respect to the second target (second signal CAM_IN), the following information is stored in the first memory space:
first falling edge at 100° CRK;
second rising edge No. 2 at 200° CRK;
third falling edge at 400° CRK;
fourth rising edge at 600° CRK;
With respect to the third target (third signal CAM_EX):
first falling edge at 200° CRK;
second rising edge at 300° CRK;
third falling edge at 500° CRK;
fourth rising edge at 600° CRK;

In a preferred embodiment, a second memory space (or second table) is also allocated that is intended for storing and processing the positions of the edges of the second and of the third target in real time. This information is stored in a second table or memory field, for example. Furthermore, as an alternative embodiment of the method of the invention, an average is calculated of the values of the positions of the edges of the second signal CAM_IN and an average is calculated of the values of the positions of the edges of the third signal CAM_EX relative to the first signal CRK on several revolutions of the first target. This data also can be stored in the second memory space.

Figure 4:
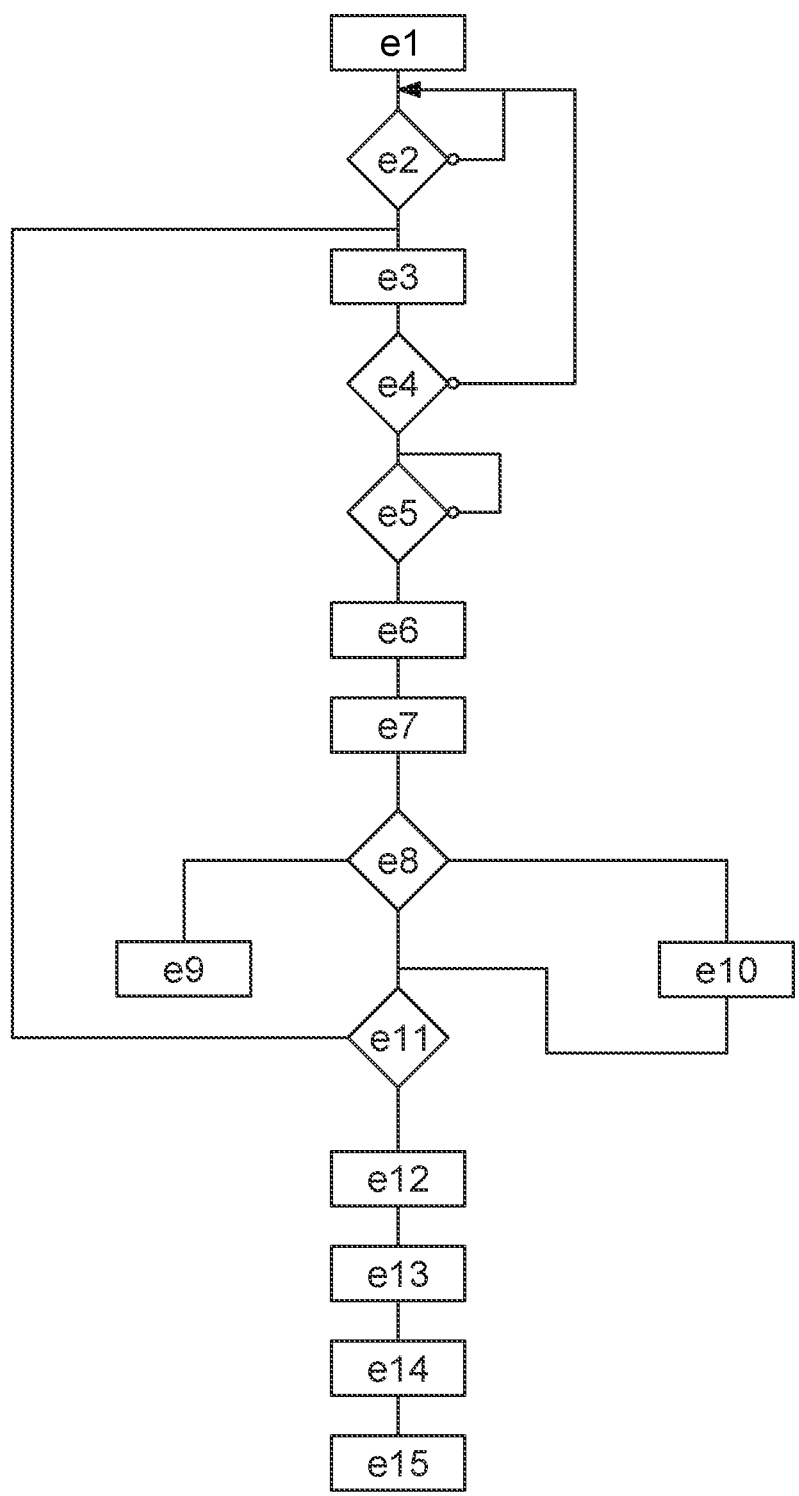
FIG. 4 is an algorithm of the method of the invention.

The method of the invention, as shown in FIG. 4, comprises a first step e1 adapted for initializing, i.e. resetting, the second memory space intended for storing and processing information associated with the positions of the edges of the slots of the second signal CAM_IN relative to the first signal CRK and with the positions of the edges of the slots of the third signal CAM_EX relative to the first signal CRK. In one embodiment, the second memory space can be a table. In this same first step e1, a counter, denoted CPT, is also initialized that is adapted for counting the revolutions completed by the first target.

During a second step e2, the method of the invention waits for an edge to appear on the fourth signal CAM_TOT that represents the passage of a tooth of the second target in front of the second sensor or of a tooth of the third target in front of the third sensor. Once an edge is detected, the method of the invention transitions to a third step e3.

During the third step e3, the method of the invention records, on the one hand, the nature of the detected edge, i.e. either a rising edge or a falling edge, and, on the other hand, the angular position of said detected edge relative to the first target (relative to a reference point of the first target). In the example used to illustrate the method implemented by the invention, the first detected edge A of the signal CAM_TOT is falling and is positioned at 105° CRK. These two items of information are stored in the second memory space. Once the information is stored, the method transitions to a fourth step e4.

During the fourth step e4, the method of the invention tests the value of the counter CPT in order to determine whether the first target has completed, for example, two revolutions corresponding to a complete engine cycle. The counter CPT increments, for example, by 1 for each revolution of the first target. In the case whereby the value of the counter CPT equals 2 (two revolutions completed by the first target), then the method proceeds to a fifth step e5, otherwise it again proceeds to the second step e2.

In the case whereby two complete revolutions of the first target have not yet been completed, then the method, during this series of steps e2, e3 and e4, detects and records the positions and also the direction of the stated edges B, C, D, E, F, G, H of the fourth signal CAM_TOT. In a preferred embodiment, during the second step e2 the edges are detected until the end of the second revolution of the first target CPT=2.

As an alternative embodiment of the second step e2, the edges are detected until the number of detected edges equals the sum of the theoretical edges of the second signal CAM_IN and of the third signal CAM_EX of the first memory space.

In another alternative embodiment of the second step e2, if all the edges are not detected after the end of the second revolution of the first target CPT=2, then two consecutive revolutions of the first target are completed again until all the edges are detected.

The aim of the method of the invention is to be able to reassign the detected edges of the fourth signal CAM_TOT either to the second signal CAM_IN or to the third signal CAM_EX.

Before the fifth step e5, after all the edges A, B, C, D, E, F, G, H of the fourth signal CAM_TOT have been detected and stored, the second memory space has the following information.

| | Engine angle position at the time of the edge | | | | | | | |
|---|---|---|---|---|---|---|---|---|
| | 105° | 202° | 203° | 303° | 404° | 506° | 601° | 603° |
| Edge direction | ↓ | ↓ | ↑ | ↑ | ↓ | ↓ | ↑ | ↑ |
| CAM_IN | X | X | X | X | X | X | X | X |
| CAM_EXT | X | X | X | X | X | X | X | X |
| Edge Number | A | B | C | D | E | F | G | H |

As an alternative embodiment, the values of the angular positions of the edges A, B, C, D, E, F, G, H of the fourth signal CAM_TOT are averaged on a determined number of revolutions of the first target. For example, 10 revolutions. Thus, by virtue of the method of the invention, all the detected edges of the fourth signal CAM_TOT have been assigned to the two signals, i.e. to the second signal CAM_IN and to the third signal CAM_EX.

The fifth step e5 involves detecting a new edge (corresponding to a new revolution of the first target). Once a new edge is detected on the fourth signal CAM_TOT, the method makes provision for proceeding to a sixth step e6.

During a sixth step e6, the features of the edge detected on the fourth signal CAM_TOT, i.e. its direction and its angular position, are compared to the features stored in the second memory space of the edges of the n−2 preceding revolution of the first target. Once the corresponding edge is found, in this example edge A will be selected, the method integrates the value of the last measured edge into the computation of the average value of said selected edge in the second memory space, i.e. its angular position. In this embodiment, the new average value computed for the angular position of the edge A is 105° CRK, corresponding to a former average value of the edge A, plus the new measured value of said edge A, with the whole being averaged. Once this operation is completed, the method proceeds to a seventh step e7. Of course, another type of computation also can be completed.

During this seventh step e7, the method of the invention cleverly computes a difference or a range of angular positions, denoted α, of the order of ±10° CRK, for example, around the average value of the computed angular position of the edge A. In this example, the values of the range of angular positions are 95° CRK and 115° CRK.

During an eighth step e8, the values stored in the first memory space, i.e. the theoretical angular positions of the slots of the second signal CAM_IN relative to the edges of the first signal CRK and of the slots of the third signal CAM_EX relative to the edges of the first signal CRK, are then compared with the values of the range of angular positions α, i.e. 95° CRK and 115° CRK.

In this case, only the third signal CAM_EX does not have a theoretical edge in the range of angular positions 95° CRK to 115° CRK. Thus, cleverly, according to the method of the invention, the edge A detected on the fourth signal CAM_TOT cannot be allocated to the third signal CAM_EX, with this step being completed during the tenth step e10.

| Engine angle position at the time of the edge | | | | | | | |
|---|---|---|---|---|---|---|---|
| 105° | 202° | 203° | 303° | 404° | 506° | 601° | 603° |
| Edge direction ↓ | ↓ | ↑ | ↑ | ↓ | ↓ | ↑ | ↑ |
| CAM_IN X | X | X | X | X | X | X | X |
| CAM_EXT | X | X | X | X | X | X | X |
| Edge Number A | B | C | D | E | F | G | H |

Thus, in order to illustrate this example, the case of the signal CAM_EX corresponding to 105° CRK is symbolically removed from the above second memory space, since this example is not possible. Cleverly, by virtue of the method of the invention, it is possible to assume that the first edge A of the signal CAM_TOT is an edge originating from the second sensor and therefore is an edge belonging to the signal CAM_IN.

In an alternative embodiment, the nature of the first edge A (falling) is subsequently compared to the nature of the corresponding theoretical edge in the first memory space. In this case, the two edges do not match, confirming the fact that the third signal CAM_EX cannot be the desired signal.

In the event that the first edge has not been able to be allocated, then the method makes provision for proceeding to a ninth step e9, in the case whereby the first edge has been able to be allocated to the second signal CAM_IN and to the third signal CAM_EX, the method makes provision for proceeding to an eleventh step e11.

During the ninth step e9, which is synonymous with the non-detection of an edge in the angular detection range, then the method of the invention advantageously considers this to mean an error in reading the edges of the fourth signal CAM_TOT. Cleverly, the method completes a dedicated memory space so that, during a service in a garage, an individual authorized to work on the vehicle will be notified of a possible error in reading or analyzing the fourth signal CAM_TOT.

Throughout the remainder of the description, the sequence of the steps of the method of the invention will be presented that are necessary for assigning (or not assigning) all the detected edges of the fourth signal CAM_TOT. This assigning (or not assigning) is completed during a complete revolution of the first target. Thus, the method of the invention tests the counter CPT in order to detect whether the first target has actually completed two revolutions, corresponding to a complete engine cycle. In the event whereby the two revolutions of the first target have not yet been completed, then the method makes provision for proceeding to the sixth step e6, otherwise the method makes provision for proceeding to an eleventh step e11.

During the sixth step e6, when the first target continues to rotate (during the operation of the internal combustion engine), a second edge B appears on the fourth signal CAM_TOT (see FIG. 3). This second edge B is a falling edge and is located at 202° CRK. Since the principle for computing the average has already been described, it will not be described in further detail hereafter.

Furthermore, the same computation of the range of angular positions α determined around the average value of the angular position of said detected edge B is completed. Thus, with respect to the second edge B, the range of angular positions α ranges between 192° CRK and 212° CRK.

Therefore, the method of the invention searches to find whether the first memory space contains at least one value of the theoretical angular positions of the slots of the second signal (CAM_IN) relative to the edges of the first signal (CRK) and of the slots of the third signal (CAM_EX) relative to the edges of the first signal (CRK), which is within the range of angular positions α.

In this case, two theoretical cases are plausible at this stage of the eighth step e8 of said method of the invention. A theoretical edge for the second signal CAM_IN located at 202° CRK and a theoretical edge of the third signal CAM_EX located at 203° CRK.

Cleverly, the method of the invention compares the direction of the plausible edges. With respect to the edge attached to the second signal CAM_IN, said signal is falling, and with respect to the edge attached to the third signal CAM_EX, said signal is rising. By way of a reminder, the second edge B is a falling edge. Thus, by virtue of this additional comparison step, it is possible, at this stage of the method of the invention, to determine that the second detected edge B is not an edge attributable to the third signal CAM_EX. This case is therefore removed from the second memory space, as illustrated hereafter.

| Engine angle position at the time of the edge | | | | | | | |
|---|---|---|---|---|---|---|---|
| 105° | 202° | 203° | 303° | 404° | 506° | 601° | 603° |
| Edge direction ↓ | ↓ | ↑ | ↑ | ↓ | ↓ | ↑ | ↑ |
| CAM_IN X | X | X | X | X | X | X | X |
| CAM_EXT | | X | X | X | X | X | X |
| Edge Number A | B | C | D | E | F | G | H |

Thus, cleverly, by virtue of the method of the invention, it is possible to assume that the second edge B of the fourth signal CAM_TOT originates from the second sensor and therefore belongs to the signal CAM_IN.

The method of the invention subsequently continues sequencing the steps as previously described. With respect to the third edge C of the fourth signal CAM_TOT, this is a rising edge and is located at 203° CRK (see FIG. 3). According to the method of the invention, the same computation of the range of angular positions α determined around the average value of the angular position of said edge C is completed. Thus, the desired range of angular positions is 193° CRK to 213° CRK.

The method of the invention searches to determine whether the first memory space contains at least one theoretical value of the edges that is within the range of determined angular positions α. In this case, two theoretical cases are plausible at this stage of the eighth step e8 of said method. A theoretical edge for the second signal CAM_IN located at 200° CRK and a theoretical edge for the third signal CAM_EX located at 200° CRK.

Cleverly, the method of the invention compares the direction of the plausible edges. With respect to the edge attached to the second signal CAM_IN, said signal is falling, and with respect to the edge attached to the third signal CAM_EX, said signal is rising. By way of a reminder, the third actual edge C is a rising edge. Thus, by virtue of this additional comparison step, it is possible, at this stage of the method of the invention, to determine that the third detected edge C is not an edge attributable to the second signal CAM_IN. This case is therefore removed from the second memory space, as symbolically illustrated hereafter.

| Engine angle position at the time of the edge | | | | | | | |
|---|---|---|---|---|---|---|---|
| 105° | 202° | 203° | 303° | 404° | 506° | 601° | 603° |
| Edge direction ↓ | ↓ | ↑ | ↑ | ↓ | ↓ | ↑ | ↑ |
| CAM_IN X | X | | X | X | X | X | X |
| CAM_EXT | | X | X | X | X | X | X |
| Edge Number A | B | C | D | E | F | G | H |

A person skilled in the art will now understand the sequence of the steps of the method for detecting and assigning the edges D, E and F. Thus, after executing the method over all the detected edges of the fourth signal CAM_TOT, the second memory space is presented with the following plausible cases.

| | Engine angle position at the time of the edge | | | | | | | |
|---|---|---|---|---|---|---|---|---|
| | 105° | 202° | 203° | 303° | 404° | 506° | 601° | 603° |
| Edge direction | ↓ | ↓ | ↑ | ↑ | ↓ | ↓ | ↑ | ↑ |
| CAM_IN | X | X | | | X | | X | X |
| CAM_EXT | | | X | X | | X | X | X |
| Edge Number | A | B | C | D | E | F | G | H |

When an eighth edge H appears on the fourth signal CAM_TOT, this eighth edge H is a rising edge and is located at an actual average value at 601° CRK, the range of angular positions α is computed around the average value of the angular position of said edge H. The range of angular positions desired for the eighth edge H is 591° CRK to 611° CRK.

The method of the invention, during the eighth step e8, searches to determine whether the first memory space contains at least one theoretical value of the edges of the signals CAM_IN and CAM_EX that is within the range of angular positions 591° CRK to 611° CRK.

The second signal CAM_IN and the third signal CAM_EX comprise, in the range of values, an edge in the same direction but with slightly different values (see FIG. 3). As the two cases are plausible, no selection is made and symbolically the markers for each signal remain allocated.

| | Engine angle position at the time of the edge | | | | | | | |
|---|---|---|---|---|---|---|---|---|
| | 105° | 202° | 203° | 303° | 404° | 506° | 601° | 603° |
| Edge direction | ↓ | ↓ | ↑ | ↑ | ↓ | ↓ | ↑ | ↑ |
| CAM_IN | X | X | | | X | | X | X |
| CAM_EXT | | | X | X | | X | X | X |
| Edge Number | A | B | C | D | E | F | G | H |

An eighth edge H appears on the fourth signal CAM_TOT. This eighth edge H is a rising edge and is located as an actual average value at 603° CRK. The desired range of angular positions for the eighth edge H is 593° CRK to 613° CRK.

The method of the invention searches to determine whether the first memory space contains at least one theoretical value of the edges of the signals CAM_IN and CAM_EX that is within the range of computed angular positions.

The second signal CAM_IN and the third signal CAM_EX comprise, in the range of values, an edge in the same direction but with slightly different values. Thus, the seventh edge G of the fourth signal CAM_TOT cannot be allocated to the second signal CAM_IN or to the third signal CAM_EX. As the two cases are plausible, no selection is made for the eighth edge H of the fourth signal CAM_TOT and symbolically the markers for each signal are always allocated.

| | Engine angle position at the time of the edge | | | | | | | |
|---|---|---|---|---|---|---|---|---|
| | 105° | 202° | 203° | 303° | 404° | 506° | 601° | 603° |
| Edge direction | ↓ | ↓ | ↑ | ↑ | ↓ | ↓ | ↑ | ↑ |
| CAM_IN | X | X | | | X | | X | X |
| CAM_EXT | | | X | X | | X | X | X |
| Edge Number | A | B | C | D | E | F | G | H |

By virtue of the invention, it is possible, in most cases of the previously described example of application, to determine and allocate edges from the fourth signal CAM_TOT to the various sensors positioned on the second target and the third target. Thus, by virtue of the method of the invention, it is possible to determine, with relatively high precision, the position of the camshaft, which thus cleverly allows an actual position of each edge to be learnt for controlling the variable distribution.

Furthermore, by virtue of the method of the invention, only two cases, i.e. two in eight edges in this example, cannot be allocated.

Cleverly, the method of the invention completes, during an additional step, an allocation test of the detected edges of the fourth signal CAM_TOT. Thus, if all the detected edges of the fourth signal CAM_TOT are allocated to the second signal CAM_IN and/or to the third signal CAM_EX, then the method of the invention is stopped. Indeed, in this case this means that the 8 detected edges of the fourth signal CAM_TOT have been assigned to the two sensors. In this case, this means that 4 edges have been assigned to the second signal CAM_IN and 4 edges have been assigned to the third signal CAM_EX.

In the case whereby the assignment test reveals an assignment anomaly, then the method of the invention completes a dedicated memory zone for indicating the presence of an anomaly assigning edges.

The twelfth step e12 of the method of the invention cleverly involves activating a phase-shift of at least one camshaft. In one embodiment, the phase-shift is completed on the second target and has a value V of −20° CRK. Cleverly, the phase-shift is greater than a, allowing easier discrimination of the non-allocated edges.

During a thirteenth step e13, the method of the invention cleverly, during two new revolutions following the first target, acquires and stores all the detected edges of the fourth signal CAM_TOT in the second memory space before proceeding to a fourteenth step e14.

During the fourteenth step e14, the method of the invention compares the average values of the unassigned edges of the second memory space before the activation of the phase-shifting on the second target with the recorded values of said edges of the fourth signal CAM_TOT after the activation of the phase-shifting.

The same computation of the range of angular positions α (±10° CRK around actual average values of the unassigned edges of the fourth signal CAN_TOT) is computed. By way of a reminder, in this example, only the seventh edge G and the eighth edge H of the signal CAM_TOT are not assigned.

During a fifteenth step e15, the method performs a comparison between the values of the unassigned edges and the new values of the edges recorded during the thirteenth step e13. Due to the application of a phase-shift of −20° CRK on the second target, the values corresponding to the edges B, D, F and G of the fourth signal CAM_TOT have an offset of 20° CRK. Cleverly, the method of the invention allocates the non-allocated edge falling within the range of angular positions to the non-phase-shifted signal. In this case, the eighth edge H of the signal CAM_TOT does not have phase-shifting (same value with or without phase-shifting) and consequently it involves, according to the method of the invention, the third signal CAM_EX. The edge, in this case the seventh edge G, which now has a phase-shift, is then allocated to the second signal CAM_IN.

By virtue of the invention, it is now possible to determine, on the basis of at least two parallel coupled current source sensors, the position of at least one target secured to a rotary shaft of an internal combustion engine, whilst substantially reducing the amount of electric wiring.

The invention is described above by way of an example. It is understood that a person skilled in the art is able to produce various variants of the invention without thereby departing from the scope of the patent.

The invention claimed is:

1. A method for detecting the position of at least one movable piston in a cylinder of a four-stroke internal combustion engine, with the movement of the piston driving a crankshaft cooperating with at least one first camshaft and one second camshaft, the crankshaft also cooperating with a first target having a determined number of teeth on a first target periphery, the first camshaft cooperating with a second target and the second camshaft cooperating with a third target, the second target having a determined number of teeth on a second target periphery and the third target having a determined number of teeth on the third target periphery, a first sensor adapted, on the one hand, for detecting the passage of the teeth of the first target and, on the other hand, for generating a first signal (CRK), a second sensor adapted, on the one hand, for detecting the passage of the teeth of the second target and, on the other hand, for generating a second signal (CAM_IN), a third sensor adapted, on the one hand, for detecting the passage of the teeth of the third target and, on the other hand, for generating a third signal (CAM_EX), the second sensor and the third sensor being sensors of the current source type coupled in parallel, the parallel coupling enabling the generation of a fourth signal (CAM_TOT), the second sensor and the third sensor also being coupled to a computer responsible for engine management, the first signal (CRK) being made up of a determined number of edges corresponding to the number of teeth of the first target, the second signal (CAM_IN) being made up of slots corresponding to the passages of the teeth of the second target, the third signal (CAM_EX) being made up of slots corresponding to the passages of the teeth of the third target, the fourth signal (CAM_TOT) being made up of slots corresponding to a sum of the second signal (CAM_IN) and of the third signal (CAM_EX), a slot being made up of a rising edge and a falling edge, a first memory space adapted for storing theoretical angular positions of the slots of the second signal (CAM_IN) relative to the edges of the first signal (CRK) and of the slots of the third signal (CAM_EX) relative to the edges of the first signal (CRK), as well as the directions of the edges of said slots, said method being characterized in that it comprises:

a first step (e1) involving initializing a second memory space adapted for storing information associated with the positions of the slots of the fourth signal (CAM_TOT) relative to the edges of the first signal (CRK), the first step (e1) further comprising a step of initializing a counter (CPT) adapted for counting a number of revolutions completed by the first target;

a second step (e2) involving waiting for an edge on the fourth signal (CAM_TOT), representing the passage of a tooth of the second target in front of the second sensor or the passage of a tooth of the third target in front of the third sensor, the second step (e2) further comprising proceeding to a third step (e3) when an edge is detected on the fourth signal (CAM_TOT);

the third step (e3) involving recording, in the second memory space, on the one hand, the nature of the detected edge, i.e. either a rising edge or a falling edge, and, on the other hand, the angular position of said detected edge relative to the first target;

a fourth step (e4) involving testing the value of the counter (CPT), in the case whereby the value of the counter (CPT) is equal to a value N then the method proceeds to a fifth step (e5), otherwise it proceeds to the second step (e2);

the fifth step (e5) involving waiting for a new edge on the fourth signal (CAM_TOT), and proceeding to a sixth step (e6) when an edge is detected on the fourth signal (CAM_TOT);

the sixth step (e6) involving computing an average of the angular position of the last detected edge with the value of the corresponding edge of the preceding revolution of the first target stored in the second memory space;

a seventh step (e7) involving computing a range of angular positions α determined around the average value of the angular position of said detected edge;

an eighth step (e8) involving selecting theoretical angular positions of the slots of the second signal (CAM_IN) relative to the edges of the first signal (CRK) and of the slots of the third signal (CAM_EX) relative to the edges of the first signal (CRK) when they are within the range of angular positions computed in the seventh step (e7); in the case whereby no theoretical angular position of the slots of the second signal (CAM_IN) and of the third signal (CAM_EX) is within the range of the computed angular positions, then the method proceeds to a ninth step (e9), in the case whereby a theoretical angular position of a slot of only one of the two signals (CAM_IN) or (CAM_EX) is within the range of computed angular positions, then the method proceeds to a tenth step (e10), in the case whereby a single theoretical angular position of a single slot of the second signal (CAM_IN) and a single theoretical angular position of a single slot of the third signal (CAM_EX) are within the range of the computed angular positions, then the method proceeds to an eleventh step (e11);

the ninth step (e9) involving generating a warning synonymous with a failure on at least one of the three signals;

the tenth step (e10) involving not assigning the detected edge to the signal (CAM_IN or CAM_EX), with the non-assigning being for the signal (CAM_IN or CAM_EX) that does not have a slot, the theoretical angular position of which is within the range of computed angular positions of said edge;

the eleventh step (e11) involving proceeding to the third step (e3) in the case whereby the value of the counter (CPT) is less than the value N, otherwise the method proceeds to a twelfth step (e12).

2. The synchronization method as claimed in claim 1, characterized in that, during the eighth step (e8), in addition, in the case whereby a theoretical angular position of a slot of only one of the two signals (CAM_IN) or (CAM_EX) is within the range of determined angular positions, the direction of said detected edge is compared with the direction of the corresponding signal (CAM_IN) or (CAM_EX).

3. The synchronization method as claimed in claim 1, characterized in that, during the eighth step (e8), in addition, in the case whereby a theoretical angular position of a slot of the second signal (CAM_IN) and a single theoretical angular position of a single slot of the third signal (CAM_EX) are within the range of determined angular positions, the direction of said detected edge is compared with the direction of the corresponding signal (CAM_IN) or (CAM_EX).

4. The synchronization method as claimed in claim 1, characterized in that the value N of the counter (CPT) equals 2.

5. The synchronization method as claimed in claim 1, characterized in that, in the sixth step (e6), the average of the angular position of the detected edge is computed on N revolutions of the first target.

6. The synchronization method as claimed in claim 1, characterized in that, in the case whereby at least one theoretical angular position of a single slot of the second signal (CAM_IN) and a single theoretical angular position of a single slot of the third signal (CAM_EX) are within the range of computed angular positions and when the counter (CPT) has reached a value N', a twelfth step (e12) is carried out involving applying a phase-shift of value (V) to one of the two targets.

7. The synchronization method as claimed in claim 6, characterized in that, during a thirteenth step (e13), the edges of the fourth signal (CAM_TOT) are detected and stored.

8. The synchronization method as claimed in claim 7, characterized in that, during a fourteenth step (e14), the average values of the unassigned edges of the second memory space before the activation of the phase-shifting on one of the two targets are compared with the recorded values of said edges of the fourth signal (CAM_TOT) after the activation of the phase-shifting.

\* \* \* \* \*